(12) United States Patent
Shen et al.

(10) Patent No.: US 10,990,557 B2
(45) Date of Patent: Apr. 27, 2021

(54) TRANSMISSION INTERFACE COMMUNICATING METHOD AND CONNECTION INTERFACE

(71) Applicant: Realtek Semiconductor Corporation, Hsinchu (TW)

(72) Inventors: Chen Shen, Suzhou (CN); Kai-Yuan Yin, Suzhou (CN); Ti-Ti Chen, Suzhou (CN); Yong-Fei Li, Wuhan (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 35 days.

(21) Appl. No.: 16/441,146

(22) Filed: Jun. 14, 2019

(65) Prior Publication Data
US 2019/0384734 A1 Dec. 19, 2019

(30) Foreign Application Priority Data
Jun. 15, 2018 (CN) .......................... 201810618983.3

(51) Int. Cl.
*G06F 13/38* (2006.01)
*G06F 13/40* (2006.01)
*G06F 13/42* (2006.01)

(52) U.S. Cl.
CPC ...... *G06F 13/4081* (2013.01); *G06F 13/4282* (2013.01); *G06F 2213/0042* (2013.01)

(58) Field of Classification Search
None
See application file for complete search history.

(56) References Cited

U.S. PATENT DOCUMENTS

| 10,331,579 B2* | 6/2019 | Gupta | G06F 13/4282 |
| 2011/0191480 A1* | 8/2011 | Kobayashi | H04N 21/43632 |
| | | | 709/227 |
| 2013/0007301 A1* | 1/2013 | Jung | G06F 1/1632 |
| | | | 710/5 |
| 2014/0013024 A1* | 1/2014 | Lamm | H01R 13/46 |
| | | | 710/313 |
| 2016/0234548 A1* | 8/2016 | Ichimura | H04N 19/00 |
| 2019/0384734 A1* | 12/2019 | Shen | G06F 13/4282 |

FOREIGN PATENT DOCUMENTS

CN 107301148 A 10/2017

OTHER PUBLICATIONS

"USB Type-C and Power Delivery DisplayPort Alternate Mode", Mar. 1, 2018, ST (Year: 2018).*

* cited by examiner

*Primary Examiner* — Hyun Nam
(74) *Attorney, Agent, or Firm* — Locke Lord LLP; Tim Tingkang Xia, Esq.

(57) ABSTRACT

A transmission interface communicating method used in a display device that includes the steps outlined below is provided. A first status update signal is received from a host device to turn a hot plug detect (HPD) status of the display device to a high status. A HPD signal having a low status is transmitted to the host device in response to the first status update signal. A configuration signal is received from the host device. A configuration acknowledgement signal is transmitted to the host device in response to the configuration signal. The HPD signal having the high status is actively transmitted to the host device.

10 Claims, 9 Drawing Sheets

TRANSMISSION INTERFACE COMMUNICATING METHOD AND CONNECTION INTERFACE

RELATED APPLICATIONS

This application claims priority to China Application Serial Number 201810618983.3, filed Jun. 15, 2018, which is herein incorporated by reference.

BACKGROUND

Field of Invention

The present invention relates to data transmission technology. More particularly, the present invention relates to a transmission interface communicating method and a connection interface.

Description of Related Art

Type-C universal serial bus (USB) interface not only provides for faster speed in comparison with traditional USB interface, but also supports DisplayPort alternate mode. As a result, a host having a Type-C USB interface can be electrically coupled to even a DisplayPort interface of a display device, and not just Type-C USB interface. However in some products in the market, the method of control, format, and signal communication implementing the Type-C USB interface in the host device may not be completely designed based on the USB specification, which can lead to communication failure between the host device and the display device.

Accordingly, what is needed is a transmission interface communicating method and a communication interface that address and remedy the issues mentioned above.

SUMMARY

The invention provides a transmission interface communicating method used in display device. The transmission interface communicating method includes the steps outlined below. The display device is electrically coupled to a host device such that a hot plug detect (HPD) status of the display device becomes a high state. A first status update signal is received from the host device. A HPD signal having a low state is transmitted to the host device in response to the first status update signal. A configuration signal is received from the host device. A configuration acknowledgement signal is transmitted to the host device in response to the configuration signal. The HPD signal having the high state is actively transmitted to the host device.

Another aspect of the present invention is to provide a connection interface that includes a first path, a second path, a third resistor and a fourth resistor. The first path has a first switch and is configured to be conducted when the first switch is closed to electrically couple a first display differential auxiliary port of a display device and a first host differential auxiliary port of a host device, wherein the first display differential auxiliary port is electrically coupled to a high level voltage source through a first resistor. The second path has a second switch and is configured to be conducted when the second switch is closed to electrically couple a second display differential auxiliary port of the display device and a second host differential auxiliary port of the host device, wherein the second display differential auxiliary port is electrically coupled to a low level voltage source through a second resistor. The third resistor is electrically coupled between the first path and a low level voltage source. The fourth resistor is electrically coupled between the second path and a high level voltage source. When the first switch and the second switch are closed, the first resistor pulls down the voltage level of the first display differential auxiliary port and the second resistor pulls high the voltage level of the second display differential auxiliary port.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
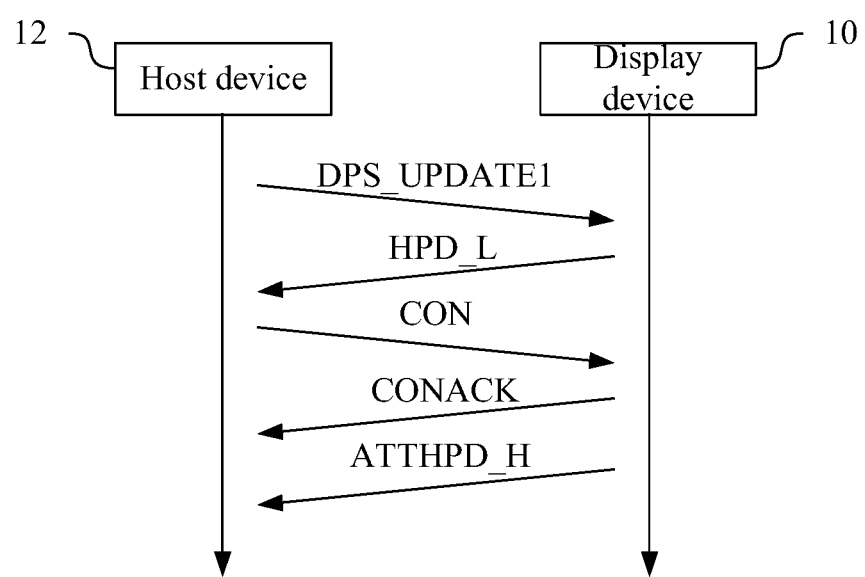
FIG. 1 is a diagram of the signal transmission between a display device and a host device in an embodiment of the present invention.
Figure 2:
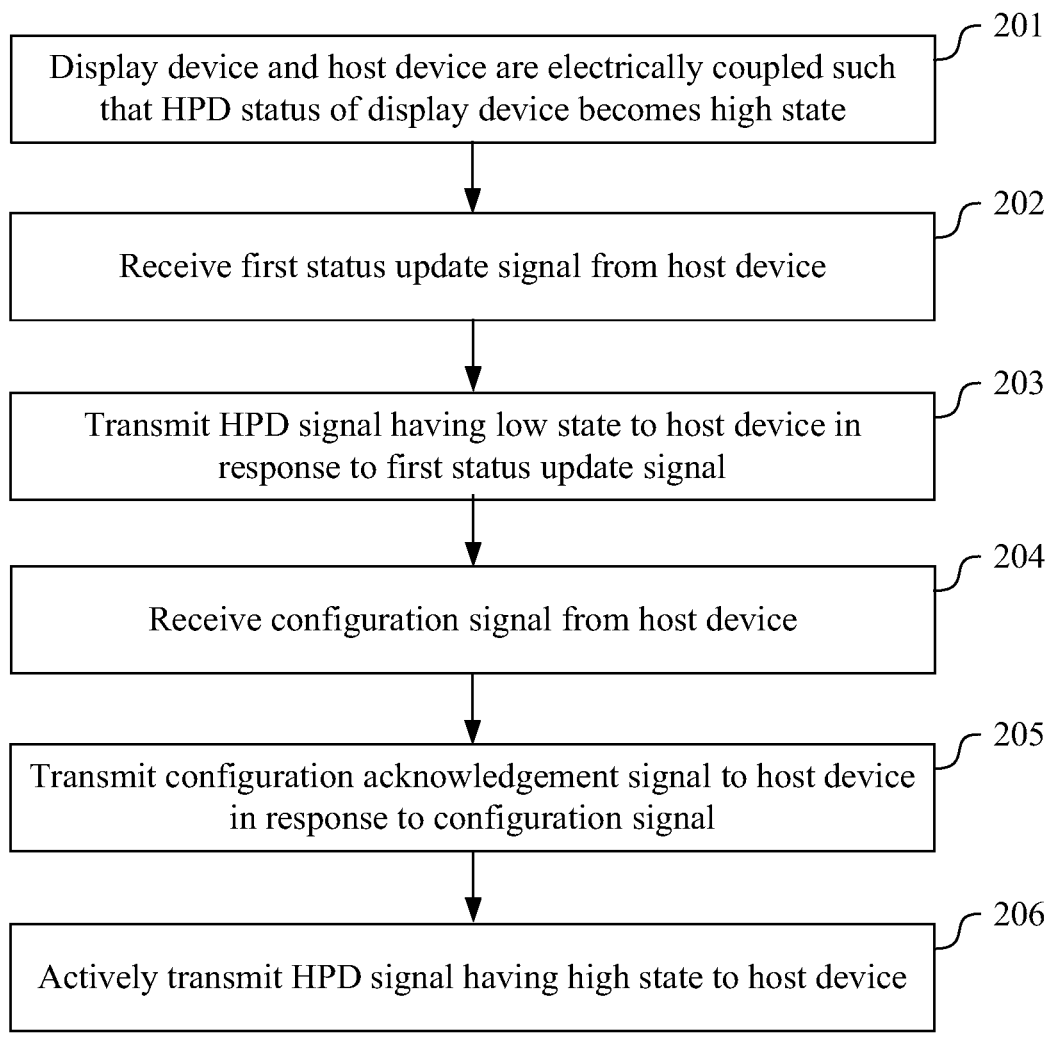
FIG. 2 is a flow chart of a transmission interface communicating method in an embodiment of the present invention.

Reference is now made to FIG. 1 and FIG. 2 at the same time. FIG. 1 is a diagram of the signal transmission between a display device 10 and a host device 12 in an embodiment of the present invention. FIG. 2 is a flow chart of a transmission interface communicating method 200 in an embodiment of the present invention.

The transmission interface communicating method 200 can be used in such as, but not limited to the display device 10 in FIG. 1. The flow of the transmission interface communicating method 200 is described in detail in accompany with FIG. 1 and FIG. 2. The transmission interface communicating method 200 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 201, the display device 10 and the host device 12 are electrically coupled such that the HPD status of the display device 10 becomes a high state.

Figure 3:
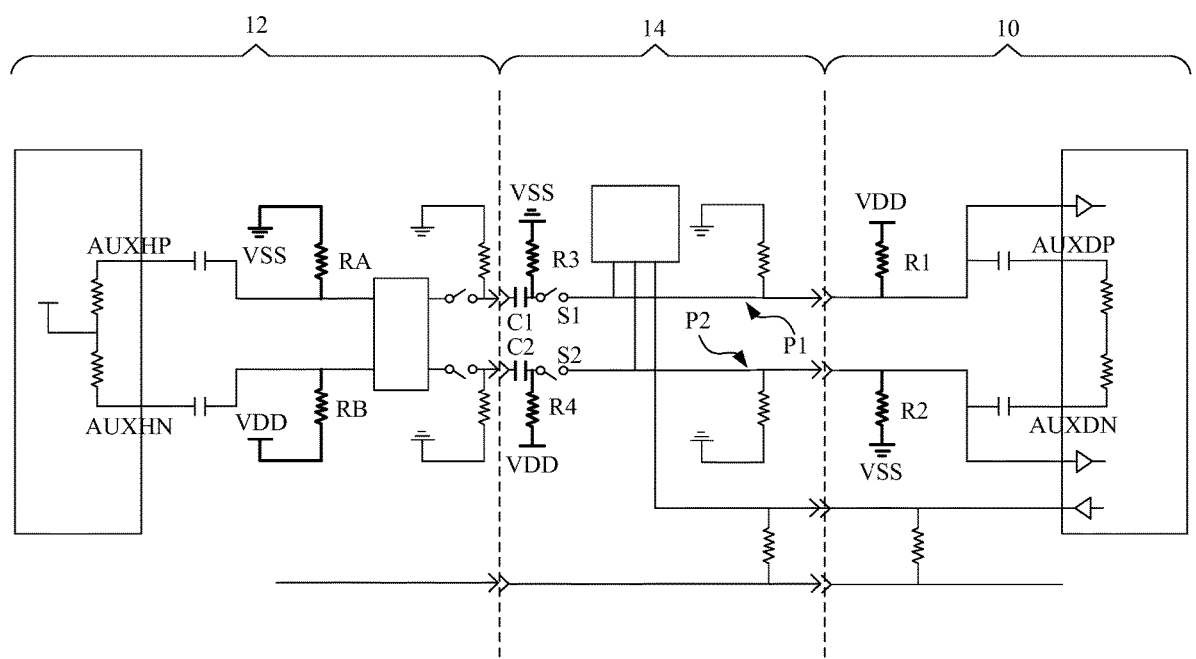
FIG. 3 is a diagram of the display device and the host device electrically coupled together through a connection interface in an embodiment of the present invention.

Reference is now made to FIG. 3 at the same time. FIG. 3 is a diagram of the display device 10 and the host device 12 electrically coupled together through a connection interface 14 in an embodiment of the present invention.

The display device 10 and the host device 12 are electrically coupled through the connection interface 14. The connection interface 14 can be such as, but not limited to an adapter.

In an embodiment, at least one of the display device 10 and the host device 12 has a Type-C universal serial bus (USB) interface that supports a DisplayPort alternate mode. For example, the host device 12 can have a Type-C USB interface and the display device 10 can have a DisplayPort interface. The host device 12 and the display device 10 can electrically couple through the connection interface 14 that is able to convert the signals of the Type-C USB interface to the signals of the DisplayPort interface. In another embodiment, both the host device 12 and the display device 10 can have the Type-C USB interface and are electrically coupled through the connection interface 14.

Under the DisplayPort alternate mode, the host device 12 acts as a DisplayPort source terminal and the display device 10 acts as a DisplayPort drain terminal. As a result, the host device 12 can transmit the image data DATA through the Type-C USB interface to the display device 10 such that the display device 10 displays the image data DATA.

The display device 10 includes a first display differential auxiliary port AUXDP and a second display differential auxiliary port AUXDN. The first display differential auxiliary port AUXDP is electrically coupled to a high level voltage source VDD through a first resistor R1. The second display differential auxiliary port AUXDN is electrically coupled to a low level voltage source VSS through a second resistor R2. In an embodiment, the high level voltage source VDD and the low level voltage source VSS can respectively be such as, but not limited to 3.3 volts and 0 volt.

The host device 12 includes a first host differential auxiliary port AUXHP and a second host differential auxiliary port AUXHN. The first host differential auxiliary port AUXHP is electrically coupled to the low level voltage source VSS through a resistor RA. The second host differential auxiliary port AUXHN is electrically coupled to the high level voltage source VDD through a resistor RB.

The connection interface 14 includes a first path P1, a second path P2, a third resistor R3 and a fourth resistor R4.

The first path P1 has a first switch S1 and the first path P1 is conducted when the first switch S1 is closed to electrically couple the first display differential auxiliary port AUXDP and the first host differential auxiliary port AUXHP. The second path P2 has a second switch S2 and the second path P2 is conducted when the second switch S2 is closed to electrically couple the second display differential auxiliary port AUXDN and the second host differential auxiliary port AUXHN.

The third resistor R3 is electrically coupled between the first path P1 and the low level voltage source VSS. The fourth resistor R4 is electrically coupled between the second path P2 and the high level voltage source VDD.

When the display device 10 and the host device 12 are connected through the connection interface 14 such that the first switch S1 and the second switch S2 are closed, a path is formed from the high level voltage source VDD through the first resistor R1, the first path P1, the third resistor R3 and to the low level voltage source VSS. The third resistor R3 pulls low the voltage level of the first display differential auxiliary port AUXHP. On the other hand, another path is formed from the high level voltage source VDD through the fourth resistor R4, the second path P2, the second resistor R2 and to the low level voltage source VSS. The fourth resistor R4 pulls high the voltage level of the second display differential auxiliary port AUXHN.

In an embodiment, the first path P1 has a first capacitor C1 and the second path P2 has a second capacitor C2 to stabilize the voltage.

By using the third resistor R3 and the fourth resistor R4, the display device 10 can detect the change of the voltage levels of the first display differential auxiliary port AUXHP and the second display differential auxiliary port AUXHN and further force the HPD status become a high state, in which the high state represents the condition that the display device 10 and the host device 12 are already electrically coupled.

In some technologies, when the display device 10 and the host device 12 are connected, the resistors RA and RB are used to change the voltage levels of the first display differential auxiliary port AUXHP and the second display differential auxiliary port AUXHN. However, when the host device 12 does not include the resistors RA and RB, the voltage level can not be changed.

Accordingly, by using the third resistor R3 and fourth resistor R4 described above, no matter the host device 12 has the resistors IRA and RB or not, the voltage levels of the first display differential auxiliary port AUXHP and the second display differential auxiliary port AUXHN can be changed such that the HPD status of the display device 10 can become high state.

In an embodiment, besides the change of the voltage levels of the first display differential auxiliary port AUXHP and the second display differential auxiliary port AUXHN, a multiple of signal transmissions can be performed in the display device 10 to activate the display device 10, e.g. the transmission of the identification information of the display device 10 back to the host device 12, the transmission of the supported format of the display port of the display device 10 back to the host device 12 and the transmission of the signal notifying the host device 12 that the display device 10 enters the DisplayPort mode (not illustrated).

In step 202, the display device 10 receives a first status update signal DPS_UPDATE1 from the host device 12.

In an embodiment, the host device 12 confirms the HPD status of the display device 10 by transmitting the first status update signal DPS_UPDATE1.

In step 203, the display device 10 transmits the HPD signal HPD_L having the low state to the host device 12 in response to the first status update signal DPS_UPDATE1.

In an embodiment, though the display device 10 and the host device 12 are electrically coupled and the HPD status of the display device 10 becomes the high state, the configuration of the auxiliary signal channel between the display device 10 and the host device 12 for data transmission is not finished yet. If the host device 12 starts to perform communication while the configuration of the auxiliary signal channel is not finished, the communication can not be performed in a proper way. As a result, the display device 10 still transmits the HPD signal HPD_L having the low state in response to the first status update signal DPS_UPDATE1.

In step 204, the display device 10 receives a configuration signal CON from the host device 12.

In an embodiment, according to the transmission of the configuration signal CON from the host device 12, the display device 10 can perform the configuration of the auxiliary signal channel accordingly.

In step 205, the display device 10 transmits the configuration acknowledgement signal CONACK to the host device 12 in response to the configuration signal CON.

After the display device 10 finishes the configuration, the display device 10 can transmit the configuration acknowledgement signal CONACK in response to the configuration signal CON to notify the host device 12 that the configuration is finished.

In step 206, the display device 10 actively transmits the HPD signal ATTHPD_H having the high state to the host device 12.

Since the auxiliary signal channel is already configured, the display device 10 can actively transmits the HPD signal ATTHPD_H having the high state to the host device 12 to notify the host device 12 that the HPD signal ATTHPD_H is already in the high state and the communication is ready to be performed.

In some technologies, the host devices 12 inquires the HPD status of the HPD status and starts to perform communication before the configuration of the auxiliary signal channel is finished. The host device 12 is not able to be connected with the display device 10 properly when such a method is used.

Accordingly, the transmission interface communicating method 200 of the present invention can assure that the host device 12 is notified that the HPD status is at the high state after the configuration of the auxiliary signal channel is finished to increase the possibility of successful connection with the host device 12.

Figure 4:
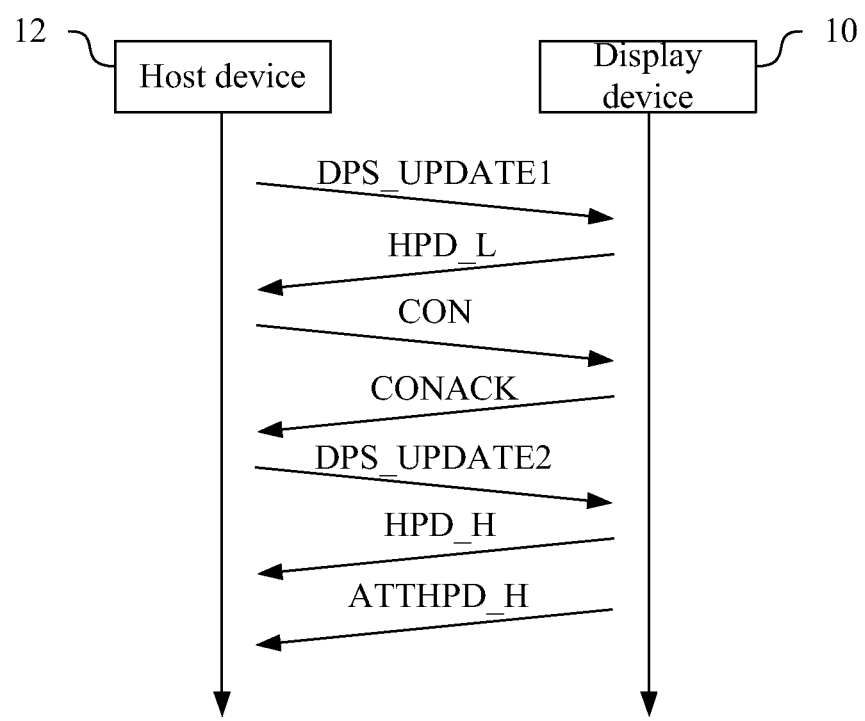
FIG. 4 is a diagram of the signal transmission between a display device and a host device in an embodiment of the present invention.
Figure 5:
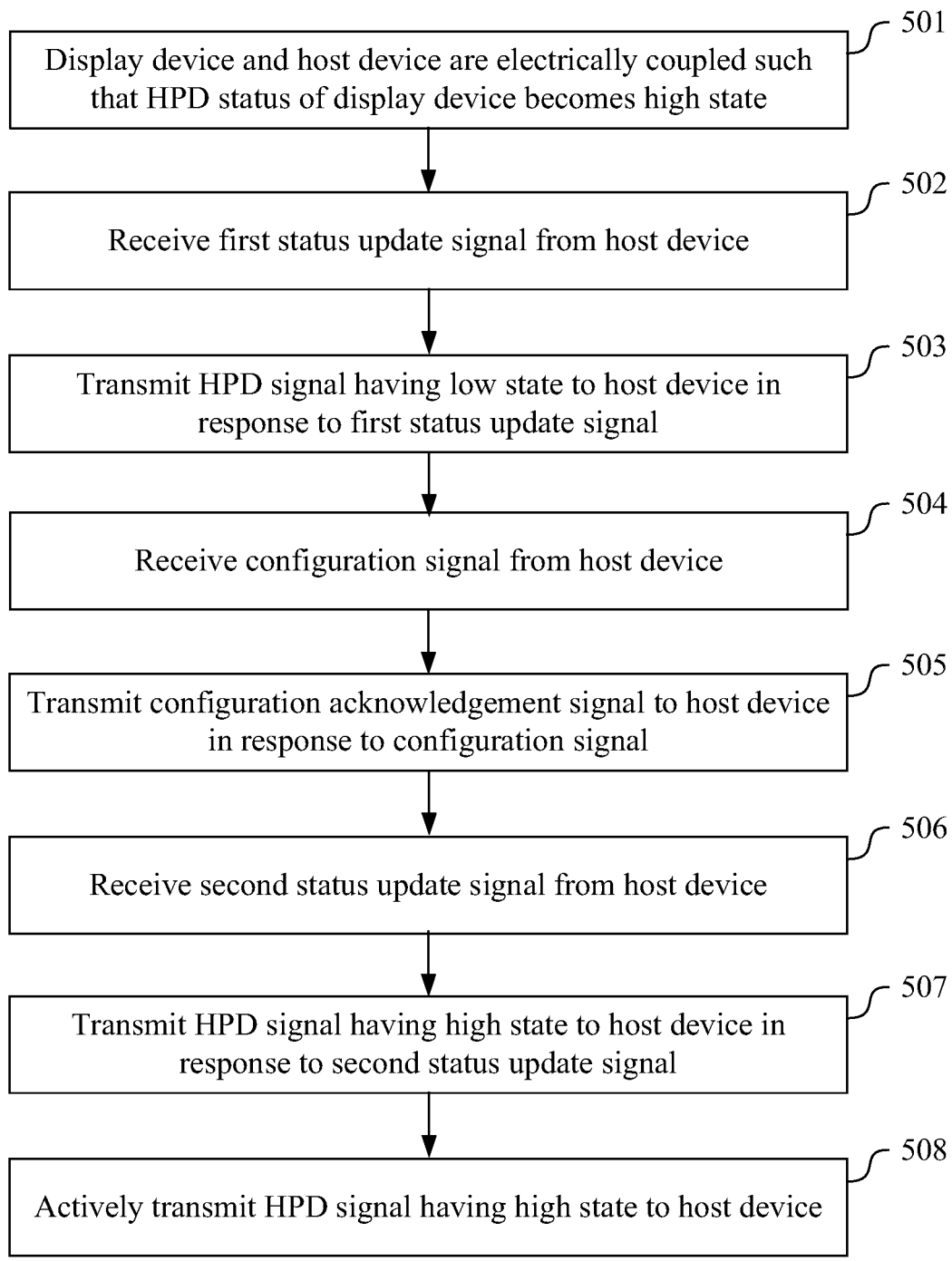
FIG. 5 is a flow chart of a transmission interface communicating method in an embodiment of the present invention.

Reference is now made to FIG. 4 and FIG. 5 at the same time. FIG. 4 is a diagram of the signal transmission between a display device 10 and a host device 12 in an embodiment of the present invention. FIG. 5 is a flow chart of a transmission interface communicating method 500 in an embodiment of the present invention.

The transmission interface communicating method 500 can be used in such as, but not limited to the display device 10 in FIG. 4. The flow of the transmission interface communicating method 500 is described in detail in accompany with FIG. 4 and FIG. 5. The transmission interface communicating method 500 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In the present embodiment, step 501 to step 505 are actually the same as the step 201 to step 205 illustrated in FIG. 2. As a result, the detail is not described herein.

In the present embodiment, after the display device 10 transmits the configuration acknowledgement signal CONACK to the host device 12 in step 505, the display device 10 receives a second status update signal DPS_UPDATE2 from the host device 12 in step 506.

In step 507, the display device 10 transmits the HPD signal HPD_H having the high state to the host device 12 in response to the second status update signal DPS_UPDATE2. Subsequently, in step 508, the display device 10 actively transmits the HPD signal ATTHPD_H having the high state to the host device 12.

In an embodiment, step 508 is performed after a predetermined time period after step 507.

In some technologies, the host device 12 transmits the second status update signal DPS_UPDATE2 again after the configuration acknowledgement signal CONACK is transmitted. Accordingly, after receiving the second status update signal DPS_UPDATE2, the display device 10 can not actively transmit the HPD signal ATTHPD_H having the high state such that the host device 12 is not able to be connected with the display device 10 properly.

As a result, the transmission interface communicating method 500 of the present invention allows the display device 10 actively transmits the HPD signal ATTHPD_H having the high state to the host device 12 after a predetermined time period after the HPD signal HPD_H having the high state is transmitted. The possibility of successful connection with the host device 12 is increased.

Figure 6:
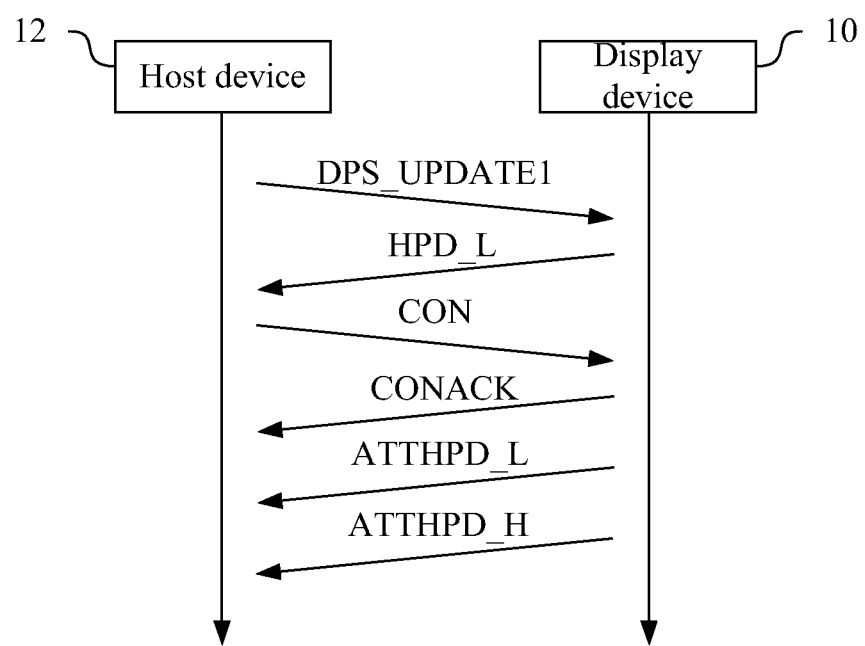
FIG. 6 is a diagram of the signal transmission between a display device and a host device in an embodiment of the present invention.
Figure 7:
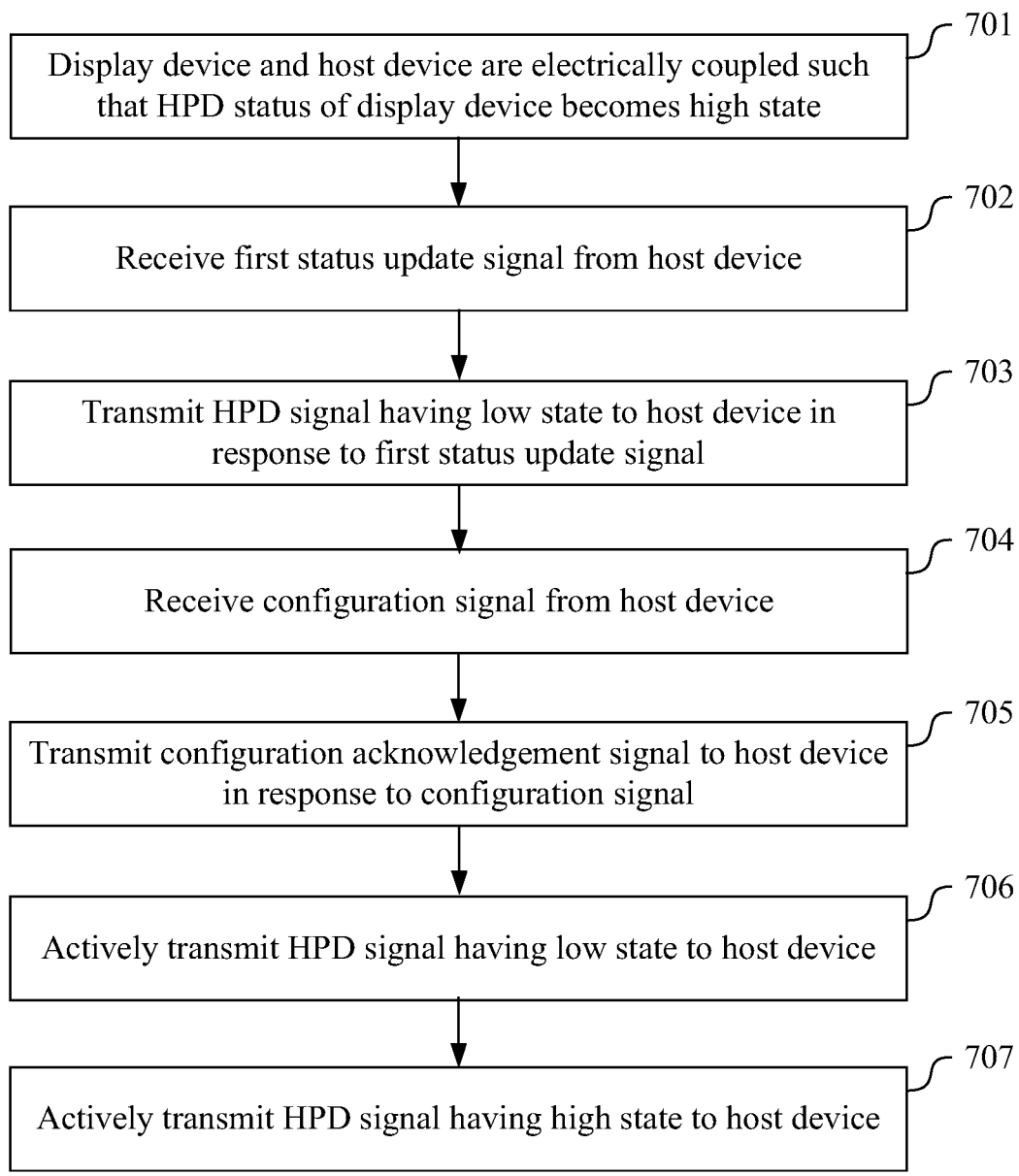
FIG. 7 is a flow chart of a transmission interface communicating method in an embodiment of the present invention.

Reference is now made to FIG. 6 and FIG. 7 at the same time. FIG. 6 is a diagram of the signal transmission between a display device 10 and a host device 12 in an embodiment of the present invention. FIG. 7 is a flow chart of a transmission interface communicating method 700 in an embodiment of the present invention.

The transmission interface communicating method 700 can be used in such as, but not limited to the display device 10 in FIG. 6. The flow of the transmission interface communicating method 700 is described in detail in accompany with FIG. 6 and FIG. 7. The transmission interface communicating method 500 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In the present embodiment, step 701 to step 705 are actually the same as the step 201 to step 205 illustrated in FIG. 2. As a result, the detail is not described herein.

In the present embodiment, after the display device 10 transmits the configuration acknowledgement signal CONACK to the host device 12 in step 705, the display device 10 actively transmits the HPD signal ATTHPD_L having the low state to the host device in step 706. Subsequently, in step 707, the display device 10 actively transmits the HPD signal ATTHPD_H having the high state to the host device.

In an embodiment, step 707 is performed after a predetermined time period after step 706.

After the display device 10 transmits the configuration acknowledgement signal CONACK, in some technologies, the host device 12 is not able to be connected with the display device 10 properly after receiving the HPD signal ATTHPD_H having the high state that is actively transmitted by the display device 10.

As a result, the transmission interface communicating method 700 of the present invention can actively transmit the HPD signal ATTHPD_L having the low state to the host device 12 first and actively transmit the HPD signal ATTHPD_H having the high state to the host device 12 subsequently. The possibility of successful connection with the host device 12 is increased.

Figure 8:
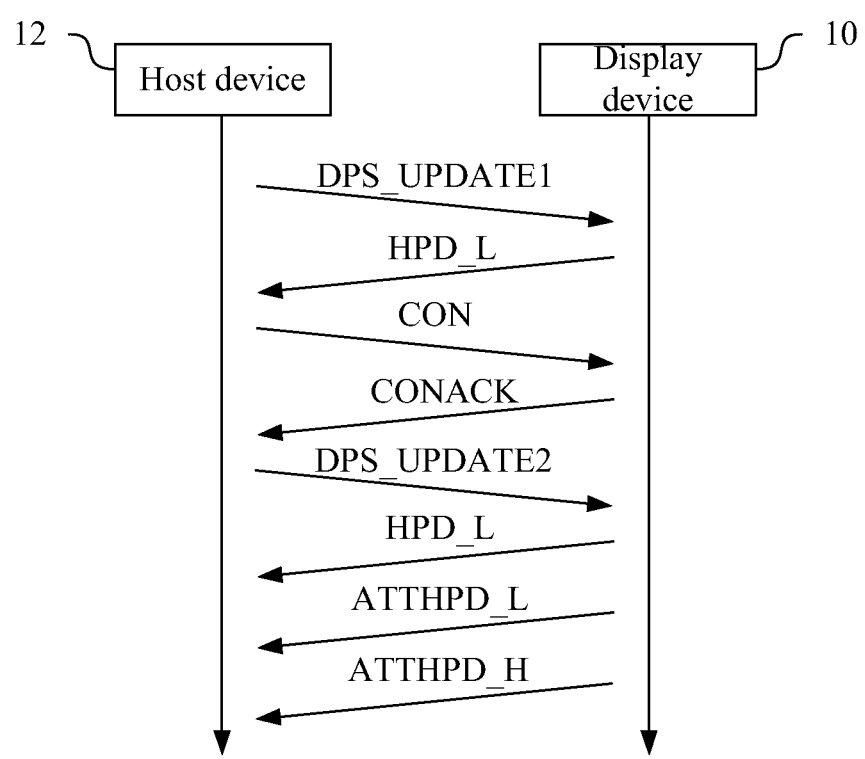
FIG. 8 is a diagram of the signal transmission between a display device and a host device in an embodiment of the present invention.
Figure 9:
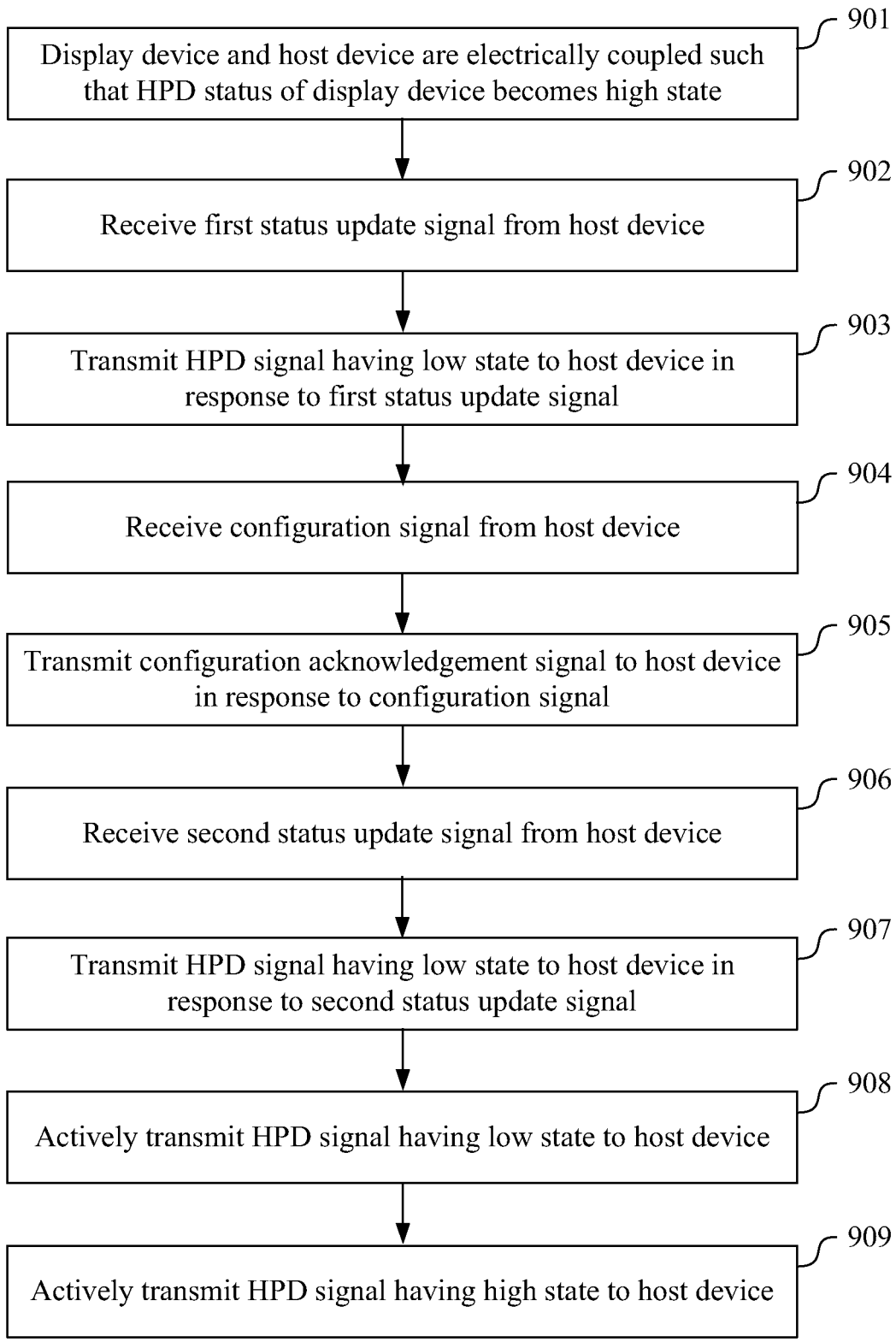
FIG. 9 is a flow chart of a transmission interface communicating method in an embodiment of the present invention.

Reference is now made to FIG. 8 and FIG. 9 at the same time. FIG. 8 is a diagram of the signal transmission between a display device 10 and a host device 12 in an embodiment of the present invention. FIG. 9 is a flow chart of a transmission interface communicating method 900 in an embodiment of the present invention.

The transmission interface communicating method 900 can be used in such as, but not limited to the display device 10 in FIG. 8. The flow of the transmission interface communicating method 900 is described in detail in accompany with FIG. 8 and FIG. 9. The transmission interface communicating method 900 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In the present embodiment, step 901 to step 905 are actually the same as the step 201 to step 205 illustrated in FIG. 2. As a result, the detail is not described herein.

In the present embodiment, after the display device 10 transmits the configuration acknowledgement signal CON-ACK to the host device 12 in step 705, the display device 10 receives the second status update signal DPS_UPDATE2 from the host device 12 in step 906.

In step 907, the display device 10 transmits the HPD signal HPD_L having the low state to the host device 12 in response to the second status update signal DPS_UPDATE2.

In step 908, the display device 10 actively transmits the HPD signal ATTHPD_L having the low state to the host device. Subsequently, in step 909, the display device 10 actively transmits the HPD signal ATTHPD_H having the high state to the host device.

The transmission interface communicating method 900 in the present embodiment combines the methods in the embodiments described above such that the display device 10 can actively transmit the HPD signal ATTHPD_H having the high state after the configuration of the auxiliary signal channel is assured to be finished. The host device 12 of different types can be connected properly with the display device 10.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A transmission interface communicating method used in a display device, the transmission interface communicating method comprising:
    electrically coupling the display device to a host device such that a hot plug detect (HPD) status of the display device becomes a high state;
    receiving a first status update signal from the host device after electrically coupling the display device to the host device such that the hot plug detect (HPD) status of the display device becomes the high state;
    transmitting a HPD signal having a low state to the host device in response to the first status update signal after receiving the first status update signal from the host device;
    receiving a configuration signal from the host device after transmitting the HPD signal having the low state to the host device in response to the first status update signal;
    transmitting a configuration acknowledgement signal to the host device in response to the configuration signal after receiving the configuration signal from the host device; and
    actively transmitting the HPD signal having the high state to the host device after transmitting the configuration acknowledgement signal to the host device in response to the configuration signal.

2. The transmission interface communicating method of claim 1, wherein before the step of actively transmitting the HPD signal having the high state to the host device, the method further comprises:
    receiving a second status update signal from the host device; and
    transmitting the HPD signal having the high state to the host device in response to the second status update signal.

3. The transmission interface communicating method of claim 1, wherein before the step of actively transmitting the HPD signal having the high state to the host device, the method further comprises:
    actively transmitting the HPD signal having the low state to the host device.

4. The transmission interface communicating method of claim 1, wherein at least one of the host device and the display device has a Type-C universal serial bus (USB) interface that supports a DisplayPort alternate mode, in which the host device acts as a DisplayPort source terminal and the display device acts as a DisplayPort drain terminal.

5. The transmission interface communicating method of claim 1, wherein the display device uses the configuration signal to configure an auxiliary signal channel of the display device.

6. The transmission interface communicating method of claim 1, wherein before the step of actively transmitting the HPD signal having the high state to the host device, the method further comprises:
    performing signal transmission through the auxiliary signal channel.

7. The transmission interface communicating method of claim 1, wherein the display device comprises a first display differential auxiliary port electrically coupled to a high level voltage source through a first resistor and a second display differential auxiliary port electrically coupled to a low level voltage source through a second resistor, and the host device comprises a first host differential auxiliary port and a second host differential auxiliary port, the step that the HPD status of the display device becomes the high state includes:
    closing a first switch such that a first path is conducted to electrically couple the first display differential auxiliary port and the first host differential auxiliary port;
    closing a second switch such that a second path is conducted to electrically couple the second display differential auxiliary port and the second host differential auxiliary port;
    pulling down the voltage level of the first display differential auxiliary port by a third resistor electrically coupled to the low level voltage source and the first path and pulling high the voltage level of the second display differential auxiliary port by a fourth resistor electrically coupled to the high level voltage source and the second path; and
    switching the HPD status of the display device to become the high state according to the change of the voltage level of the first display differential auxiliary port and the second display differential auxiliary port.

8. The transmission interface communicating method of claim 7, wherein the third resistor, the fourth resistor, the first switch and the second switch are disposed in an adapter.

9. The transmission interface communicating method of claim 7, wherein the first path has a first capacitor and the second path has a second capacitor.

10. A connection interface adapted for an adaptor configured to connect a display device to a host device, comprising:

a first path, having a first switch and configured to be conducted when the first switch is closed to electrically couple a first display differential auxiliary port of the display device and a first host differential auxiliary port of the host device, wherein the first display differential auxiliary port is electrically coupled to a high level voltage source through a first resistor;

a second path, having a second switch and configured to be conducted when the second switch is closed to electrically couple a second display differential auxiliary port of the display device and a second host differential auxiliary port of the host device, wherein the second display differential auxiliary port is electrically coupled to a low level voltage source through a second resistor;

a third resistor electrically coupled between the first path and a low level voltage source; and a fourth resistor, electrically coupled between the second path and a high level voltage source;

wherein when the first switch and the second switch are closed, the first resistor pulls down the voltage level of the first display differential auxiliary port and the second resistor pulls high the voltage level of the second display differential auxiliary port.

* * * * *